United States Patent
Konate

(10) Patent No.: US 9,453,589 B2
(45) Date of Patent: Sep. 27, 2016

(54) TENSIONER FOR THE CONTROLLED CLAMPING AND MOVING OF AN ELONGATED BODY, IN PARTICULAR FOR AN INSTALLATION FOR LAYING PIPELINES, UMBILICALS OR CABLES

(71) Applicant: Karamoko Konate, Saint-Rogatien (FR)

(72) Inventor: Karamoko Konate, Saint-Rogatien (FR)

(73) Assignee: REEL, Saint-Cyr-Au-Mont-d'Or (FR)

( * ) Notice: Subject to any disclaimer, the term of this patent is extended or adjusted under 35 U.S.C. 154(b) by 88 days.

(21) Appl. No.: 14/524,307

(22) Filed: Oct. 27, 2014

(65) Prior Publication Data

US 2015/0115091 A1 Apr. 30, 2015

(30) Foreign Application Priority Data

Oct. 31, 2013 (FR) ...................................... 13 60680

(51) Int. Cl.
*F16L 1/00* (2006.01)
*F16L 1/235* (2006.01)
*B65H 59/22* (2006.01)

(52) U.S. Cl.
CPC ................. *F16L 1/00* (2013.01); *B65H 59/22* (2013.01); *F16L 1/235* (2013.01)

(58) Field of Classification Search
CPC ............... F16L 1/00; F16L 1/16; F16L 1/18; F16L 1/19; F16L 1/23; F16L 1/235; B65H 59/22; H02G 1/00; H02G 1/08; H02G 3/22
See application file for complete search history.

(56) References Cited

U.S. PATENT DOCUMENTS

| 5,961,410 A * | 10/1999 | Yamamoto | F01L 1/02 474/110 |
| 8,794,874 B2 * | 8/2014 | Roodenburg | F16L 1/23 405/158 |
| 2015/0126315 A1 * | 5/2015 | Farewell | F02B 67/06 474/109 |

FOREIGN PATENT DOCUMENTS

| FR | 2 953 579 A1 | 6/2011 |
| GB | 2 199 632 A | 7/1988 |
| WO | 96/00359 A1 | 1/1996 |

OTHER PUBLICATIONS

FR Search Report, dated Jun. 17, 2014, from corresponding FR application.

* cited by examiner

*Primary Examiner* — Monica Carter
*Assistant Examiner* — Seahee Yoon
(74) *Attorney, Agent, or Firm* — Young & Thompson

(57) ABSTRACT

A tensioner for the controlled clamping and moving of an elongated body (A), in particular for an installation for laying pipelines, umbilicals or cables, includes a frame carrying at least two guiding boxes (3) that are arranged about an axis of symmetry (4), for clamping a segment of the elongated body (A). The guiding boxes (3) according to the invention are mounted mobile on their support frame through operating elements (5) including: (i) at least one linear actuator (5) including an operating cylinder extended by spring element, which operating cylinder and which spring element each have a longitudinal extension axis, the extension axes being oriented coaxially, or at least approximately coaxially, relative to each other, so as to form together the extension axis of the linear actuator; and (ii) programmable elements for controlling the operating cylinder in extension.

10 Claims, 3 Drawing Sheets

TENSIONER FOR THE CONTROLLED CLAMPING AND MOVING OF AN ELONGATED BODY, IN PARTICULAR FOR AN INSTALLATION FOR LAYING PIPELINES, UMBILICALS OR CABLES

TECHNICAL FIELD TO WHICH RELATES THE INVENTION

The present invention relates to a tensioner for the controlled clamping and moving of an elongated body, adapted in particular to equip an installation for laying pipelines, umbilicals or cables.

TECHNOLOGICAL BACK-GROUND

Certain installations are designed to allow the laying of elongated body, on a receiving surface, in particular flexible or rigid cables, umbilicals or pipelines. This type of installation is met in particular on ships equipped for the laying of cables, umbilicals or pipelines, along sea floors.

Such laying installations generally comprise an equipment called a tensioner ensuring a handling of the elongated body by clamping and moving it to allow a controlled laying.

More precisely, a first role of the tensioner is to constantly clamp the cable, the umbilical or the pipeline in the efficient manner, taking into account that the weight of the part of the elongated body that is transferred out of the ship increases significantly as the laying operation goes along.

The second role of the tensioner is to manoeuver the elongated body to ensure its longitudinal displacement, in a controlled manner. The applied speed of laying depends on several parameters, in particular on the relief of the receiving surface; this speed of laying also depends on the time required for assembling the cable, umbilical or pipeline portions, this assembly being generally made directly on the ship, at the time of the laying operations.

To fulfil these constraints, the tensioners conventionally comprise a frame carrying a plurality of guiding boxes that are mobile perpendicularly to the axis of the elongated body, to ensure the desired clamping all along the laying of the elongated body.

But the cables, umbilicals or pipelines frequently exhibit variations of section over their length, linked in particular to the presence of welding beads for assembling the various constitutive segments (causing diameter defects, generally of the order of 15 mm), or due to the repairing operations performed in case of degradation (in this case, the variations of diameter may reach 40 mm, due to the additional repairing layers added).

Due to these variations of section, the clamping force applied by the present tensioners may change during the guidance of the laying, and be sometimes too high or too low.

On the other hand, the clamped segments of the body is not always optimally centred within the tensioner, hence creating effort differences between the guiding boxes.

Moreover, a problem is also met with the present tensioners in case of power supply cut-off.

Indeed, in this context, the boxes are immobilized relative to each other, whereas the associated body is liable to still exert significant efforts on either one of said boxes.

OBJECT OF THE INVENTION

With regard to these problems, the applicant has developed a new structure of tensioner that is adapted to ensure an efficient clamping of the elongated member, all along the laying thereof, by a suitable handling whatever the variations of section thereof.

The corresponding tensioner has also for interest to maintain and allow a certain adjustment of the clamping on the associated elongated body, in case of power supply cut-off.

For that purpose, the operating means associated with each of the boxes of the tensioner according to the invention comprise:
(i) at least one linear actuator including an operating cylinder extended by spring means, which operating cylinder and which spring means each have a longitudinal extension axis, said extension axes being oriented coaxially, or at least approximately coaxially, relative to each other, so as to form together the extension axis of said linear actuator, and
(ii) programmable means for controlling said operating cylinder in extension.

A tensioner equipped with such operating means proves in practice to be particularly efficient in terms of clamping and moving of the associated body, thanks to a steady or at least approximately steady clamping force. This tensioner is more particularly secure due to the improvement of its clamping holding capacity in case of power supply cut-off.

According to a preferred embodiment, the operating cylinder(s) consist in electric cylinders each including electric motor means for the rotational operation of a screw associated with a nut carried by a rod part.

Still preferably, the spring means consist in a cylinder-shaped spring, for example a gas spring, a metal spring or an elastomer spring (advantageously in the form of a cylinder, i.e. advantageously a gas cylinder, a spring cylinder or an elastomer cylinder).

According to a particularly interesting embodiment, the linear actuator is equipped with force sensor means, to measure at least the value of the compression force exerted on it, along its longitudinal extension axis; moreover, the operating cylinder and the spring means each include extension sensor means, to measure the value of their respective extensions; and the programmable means control the extension of said operating cylinder as a function, on the one hand, of said measured compression force value and of a compression force set-value, and on the other hand, of the linear actuator extension value measured by said extension sensors.

Such a structure aims to further optimize the operation of the tensioner in terms of clamping of the associated elongated body; it also favours the centering of the segment of elongated body in the tensioner.

In this case, the tensioner advantageously includes at least two boxes arranged opposite to each other, distributed about its axis of symmetry; and the programmable means associated with said opposite boxes control the extension of the operating cylinders also as a function of the extension value of said opposite linear cylinders. Moreover, the programmable means advantageously control the extension of the opposite operating cylinders in such a manner that the extension values of the opposite linear cylinders are identical or at least approximately identical.

Furthermore, the extension sensor means equipping the spring means preferably consist in a linear encoder.

And in the case of operating cylinders consisting in electric cylinders, the extension sensor means equipping said cylinder(s) are advantageously each in the form of a rotational encoder.

Other advantageous characteristics of the invention are also presented hereinafter:

the operating cylinders each have a stroke length that is higher than the stroke length of the spring means;

the linear actuators are each fixed on the tensioner frame and on one of the guiding boxes, and they are oriented so that their operating cylinder is fastened to said tensioner frame, and so that their spring means are fastened to one of said guiding boxes;

the tensioner is arranged so that its axis of symmetry is oriented vertically, or at least approximately vertically;

the boxes, at least 2 in number (for example, 2, 3 or 4 in number) are each equipped with at least one guiding chain.

DETAILED DESCRIPTION OF AN EXEMPLARY EMBODIMENT

The invention will be further illustrated, without being limited in any way, by the following description of a particular embodiment, given only by way of example, and shown in the appended drawings, in which.

Figure 3:
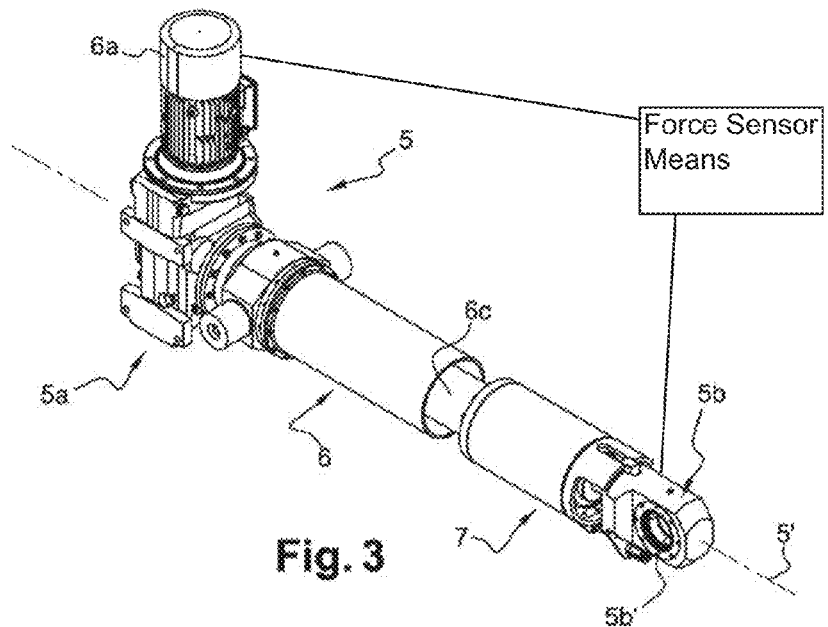
FIG. 3 is a perspective view of a linear actuator constitutive of the means for operating the boxes according to FIG. 1 or 2.
Figure 4:
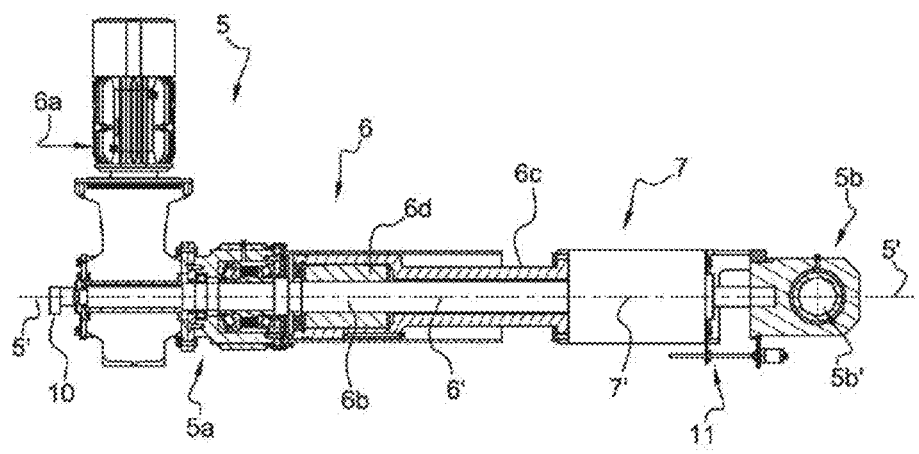
FIG. 4 is a side view of the linear actuator of FIG. 3, with a longitudinal sectional plane.
Figure 5A:
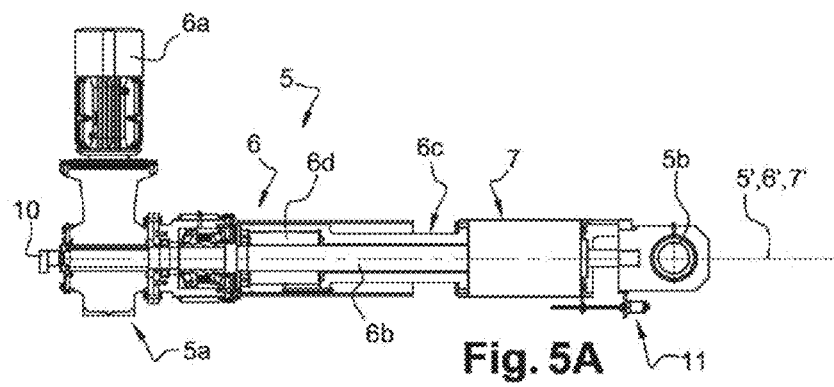
Figure 5B:
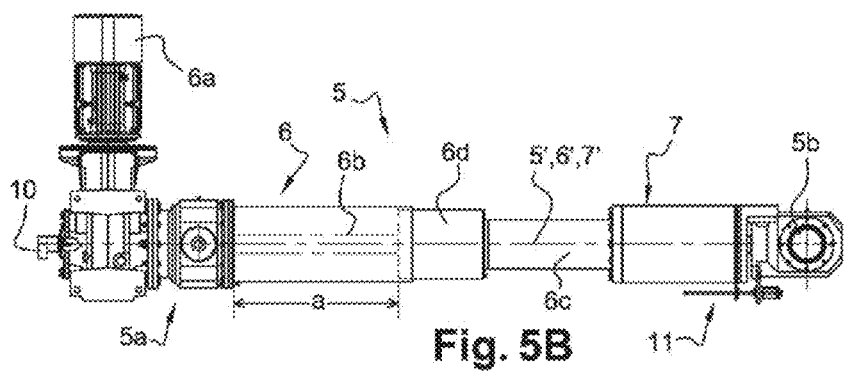
Figures 6A, 6B:
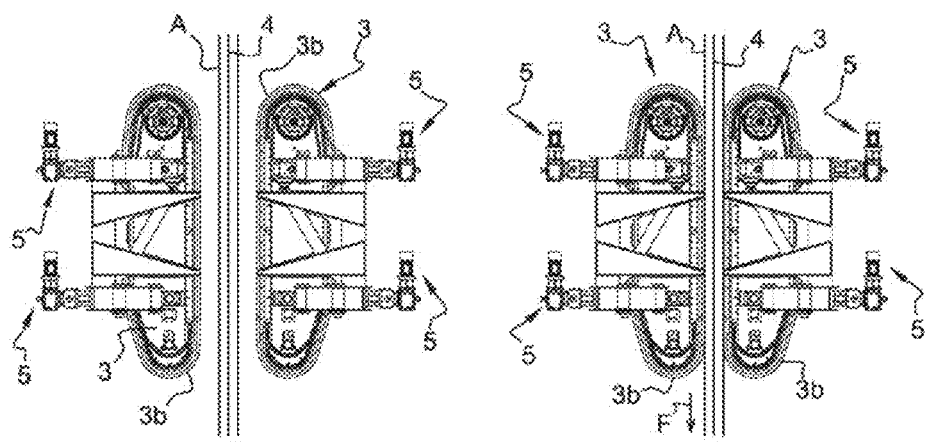

FIGS. 5A and 5B show the linear actuator according to FIGS. 3 and 4, in two different configurations: on the one hand, with the operating cylinder retracted and the elastic spring means deployed, in FIG. 5A (viewed from the side and according to a longitudinal sectional plane), and on the other hand, with the operating cylinder deployed and the spring means retracted, in FIG. 5B (viewed from the side);

FIGS. 6A and 6B show two opposite guiding boxes, respectively in spaced-apart configuration (FIG. 6A) and in close-together configuration (FIG. 6B).

Figure 1:
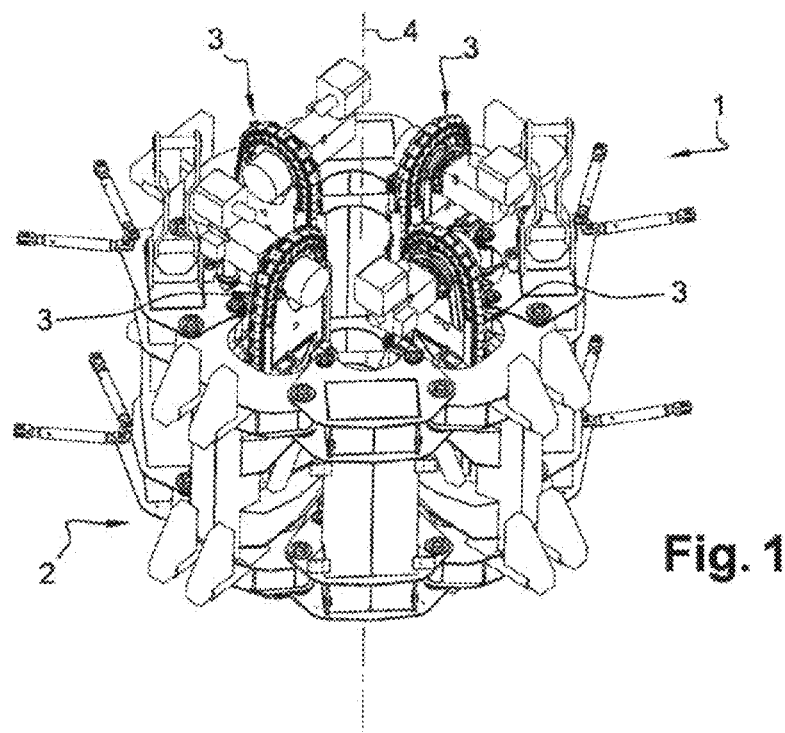
FIG. 1 is an overall perspective view of a tensioner according to the invention.

The tensioner 1, shown in FIG. 1, is adapted in particular to equip an installation for laying pipelines, umbilicals or cables, intended to be carried by a ship or an off-shore platform (not shown).

This tensioner 1 comprises a frame 2 that is provided with means for the fixation thereof on the deck of the ship or of the off-shore platform; this frame 2 carries guiding boxes 3 that are arranged about an axis of symmetry 4 and that are intended to clamp a segment of length of the pipeline (or umbilical or cable) to be laid.

According to the laying method, the tensioner 1 is positioned so that its axis of symmetry 4 is oriented (i) vertically or substantially vertically, or (ii) horizontally or at least substantially horizontally.

In FIG. 1, the guiding boxes 3 are four in number.

According to the design of the tensioner 1, the guiding boxes 3 may also be two or three in number, or even more.

Within the tensioner 1, the guiding boxes 3 are, as the case may be, distributed into two pairs, which extend in two perpendicular planes, crossing each other at a line merged with the axis of symmetry 4.

Figure 2:
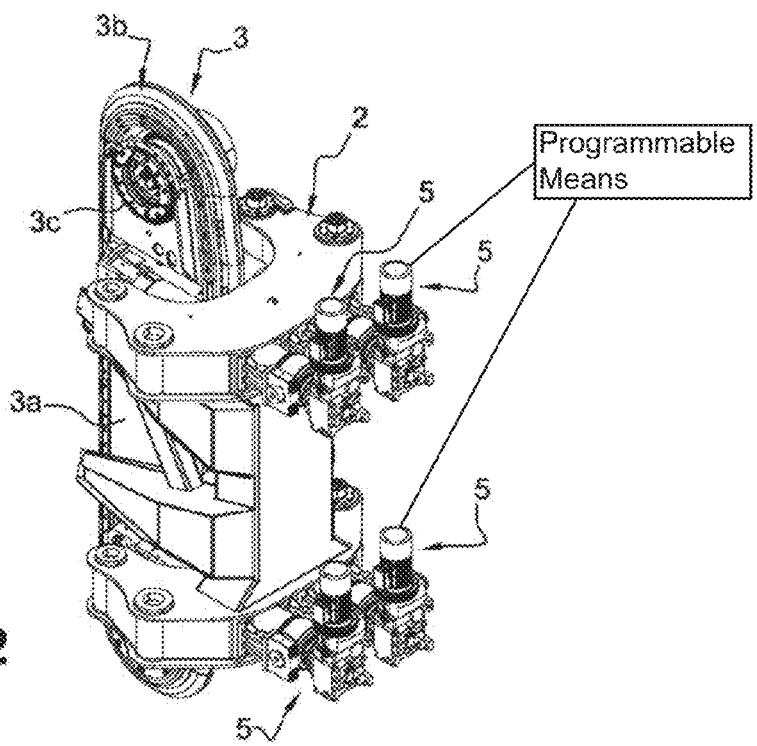
FIG. 2 is a perspective view of one of the guiding boxes equipping the tensioner of FIG. 1, and of its translation operating means.

As shown in FIG. 2, the guiding boxes 3, of conventional structure, each comprise an elongated support body 3a on which is translationally guided a peripheral guiding chain 3b, driven by at least one motorized gear 3c.

As can be seen in FIGS. 6A and 6B, a forward strand of this peripheral chain 3b extend parallel to the axis of symmetry 4, to form the surface of contact with a segment of the body to be laid.

The support body 3a of this guiding box 3 is mounted on the frame 2 through operating means ensuring the translational control of the boxes 3 parallel to each other, and according to a direction perpendicular to the axis of symmetry 4 of the tensioner 1.

The operating means associated with each of the boxes 3 comprise (i) linear actuators 5 (FIG. 2), ensuring the translational displacement of the boxes 3, and (ii) control means (not shown) for controlling said actuators 5 and said associated boxes 3.

More precisely, and as shown in FIG. 2, each box 3 is associated with a set of four linear actuators 5, distributed by pairs on either side of the support body 3a. For simplification, these linear actuators 5 are not shown in FIG. 1.

These different actuators 5 have an identical structure, as described hereinafter with reference to FIGS. 3 and 4.

As can be seen in FIGS. 3 and 4, each linear actuator 5 is consisted by (i) an operating cylinder 6, extended by (ii) spring means 7.

The operating cylinder 6 and the associated spring means 7 have respectively a longitudinal extension axis 6' and 7'.

These extension axes 6' and 7' are oriented coaxially, or at least approximately coaxially, relative to each other, to form together the general extension axis 5' of the linear actuator 5.

The operating cylinder 6 herein consists in an electric cylinder including electric motor means 6a for rotationally driving an operating screw 6b, preferably a satellite-roll screw, associated with a mobile rod element 6c, through a satellite nut 6d.

Such an electric cylinder may be chosen among those commercially available. It advantageously has a pushing (and/or pulling) force higher than or equal to 250 kN, with a stroke higher than or equal to 250 mm.

On the other hand, the motor means 6a may include a low power reduction and/or a two-rotational-direction reduction.

This electric cylinder 6 is also advantageously chosen among those including two extension speeds: (i) a slow clamping speed, for example over 50 mm, and (ii) a fast approach speed, corresponding for example to a speed twice higher than the above-mentioned clamping speed.

The spring means 7 advantageously consist in a device provided with elastic means so that it can recover its initial shape when the deformation stress is stopped, advantageously in the form of a spring-effect (or return-spring) cylinder.

The spring means 7 are advantageously chosen among the cylinder-shaped springs, i.e. preferably the gas-type, metal-spring or elastomer compression/tension springs.

These spring means are moreover advantageously chosen among those commercially available, and which have a linear stiffness over a stroke comprised between 50 and 150 mm, and preferably a linear stiffness over a stroke of the order of 100 mm.

Preferably, the stiffness of these spring means 7 is chosen with a capacity higher than or equal to 250 kN.

The two elements 6 and 7 constitutive of the linear actuator 5 are juxtaposed and fastened to each other, in combination with fixation means (for example of the bolting type). More precisely, the spring means 7 are herein carried by the mobile part 6c of the operating cylinder 6.

The thus-consisted linear actuator 5 includes:
(i) a first end 5a, consisted by the free end of the operating cylinder 6 (at the opposite of the spring means 7), including means for its fastening to the tensioner frame 2, consisted for example by the pins of the cylinder, and
(ii) a second end 5b, consisted by the free end of the spring means 7 (at the opposite of the operating cylinder 6), including means 5b for its fastening to the associated box 3 (and in particular its support body 3a), for example in the form of an instrumented axis (indicated the effort applied by the cylinder).

For an optimum control of the clamping action of the boxes 3 on the associated elongated body, a set of sensor means is provided for measuring physical quantities at the associated linear actuators 5.

At least one of the linear actuators 5 associated with each box 3 is equipped with such sensor means. But, preferentially, all the linear actuators 5 are equipped with these sensor means.

Firstly, the linear actuator 5 is equipped with force sensor means, to measure the compression, and possibly tension, force value, that is exerted on it according to a direction oriented coaxially to its longitudinal extension axis 5' and generated by the body bearing on the associated box 3.

These force sensor means (schematically shown in FIG. 3) are advantageously chosen among:
(i) motor-torque control means equipping the motor means 6a of the electric cylinder 6, and/or
(ii) effort sensor means, for example of the load cell type, which are installed at its end 5b intended to be associated with one of the boxes 3.

The motor-torque control means consist for example in means for measuring the electric current in the motor.

The effort sensor means consist for example in a device of the strain gauge type, in this case in the form of an instrumented axis.

These force sensor means allow to obtain a compression (and/or tension) value exerted on the actuator, advantageously expressed in Newton.

On the other hand, the linear actuator 5 is also equipped with extension sensor means, to measure the value of its extension along the longitudinal axis 5'.

More precisely, the operating cylinder 6 and the spring means 7 each include their own extension sensor means, to measure the value of their respective extension and the total extension value of the actuator 5.

The extension sensor means equipping the electric cylinder 6 advantageously consist in a rotational encoder 10 that is associated with the screw 6b. It may be, for example, an absolute rotational encoder.

The elastic spring means 7 are equipped with a linear encoder 11 that is chosen, for example, among the absolute magnetic band encoders, the cable displacement sensors, or the capacitive displacement sensors.

The programmable means (schematically shown in FIG. 2) are connected to the linear actuators 5 and to their different sensor means, so as to ensure the optimum control of the boxes 3, in particular in terms of clamping on the guided body.

These programmable means include means for controlling the extension of the operating cylinder 6 as a function:
(i) on the one hand, of the compression force value measured by the above-mentioned force sensor means and taking into account a compression force set-value,
(ii) on the other hand, of the extension value of the linear actuator 5 measured by the extension sensors 10 and 11.

These programmable means, suitably configured, aim to ensure an optimum clamping force of the boxes 3 on the pipeline (or umbilical or cable), and to correctly adjust the position of the segment of pipeline with respect to the axis of symmetry 4 of the tensioner 1. They also allow to keep constant the effort between the different cylinders.

In practice, the compression force set-value is adjusted and chosen so as to be advantageously located in the middle, or in a defined intermediate position, of the linear stiffness stroke of the elastic spring means 7.

In parallel of this setting of the clamping of the boxes 3 on the pipeline (or umbilical or cable), the structure of the tensioner 1 allows to know at any time the extension value of each linear actuator 5.

This functional feature allows the programmable means to control the extension of the operating cylinders 6 so that the linear actuators 5 associated with the opposite boxes 3 have identical, or at least approximately identical, extension values.

FIGS. 5A and 5B illustrate the movements of the two elements 6 and 7 constitutive of the above-described linear actuator 5.

The cylinder 6 is operated in retraction (FIG. 5A) and in extension (FIG. 5B) by the programmable means, along its longitudinal extension axis 6'.

The spring means 7 are independent with respect to the programmable means; they undergo phenomena of extension (FIG. 5A) and retraction (FIG. 5B) as a function of the compression force exerting on the linear actuator 5, along its longitudinal axis 5'.

An exemplary implementation of two opposite boxes 3 is schematically illustrated in relation with FIGS. 6A and 6B, for the clamping of a pipeline A (or umbilical or cable).

The first operation step consists in a phase of clamping the pipeline A.

For that purpose, each rotational motor 6a of the linear actuators 5 is actuated in fast speed to ensure the deployment of the electric cylinder 6 (as illustrated in FIG. 5B) and to carry out the first millimeters of approach towards the pipeline A.

When the boxes 3 arrive at a few millimeters of the point of impact, the motors 6a switch to the small speed.

At the moment of the impact, the spring means 7 are compressed (as illustrated in FIG. 5B), until the measured compression force value reaches the predetermined set-value.

When this set-value is reached, the programmable means control the stopping of the motors 6a and their locking into position.

The clamping on the segment of pipeline A is then complete and suitable (FIG. 6B).

From this clamped configuration of the boxes 3 on the pipeline A, the process than passes to a so-called phase of regulation and controlled moving of the pipeline. For that purpose, the driving chains 3c of the boxes 3 are operated to ensure the controlled translation of the pipeline A, as illustrated by the arrow F in FIG. 6B. If the section of the pipeline A varies between the two boxes 3, the elastic spring means 7 are compressed or deployed, hence maintaining a regular clamping effort on the elongated body A on its way.

In the case where the compression force value reaches a maximum or minimum threshold value, the programmable means restart the motor 6a of the corresponding electric cylinder(s) 6, at the small speed, for their retraction or deployment, respectively, over a sufficient distance to recover the compression force set-value.

In this phase of regulation, the boxes 3 are also operated so as to maintain an optimum centering of the pipeline A with respect to the general axis 4 of the tensioner 1. For that purpose, the programmable means control the extension of the operating cylinders 6 so that the extension values of the linear actuators 5 associated with the opposite boxes 3 are identical or at least approximately identical.

Of course, a similar control is implemented on the other two boxes 3 constitutive of the tensioner 1.

In the case of a stopping of control of the linear actuators 5 (power supply cut-off, failure of the control means, etc.), the elastic spring means 7 allow to preserve a possibility of length variation at the boxes 3, hence adapted to limit up to a certain level the compression efforts exerted on these latter.

The tensioner according to the invention proves to be particularly efficient to ensure the controlled clamping and moving of a body exhibiting variations of section. It also ensures a function of security, by maintaining a clamping on the elongated body during the laying, in case of a non-wanted stop of control of the associated actuators.

The invention claimed is:

1. A tensioner for the controlled clamping and moving of an elongated body (A), which tensioner (1) comprises a frame (2) carrying at least two guiding boxes (3) that are arranged about an axis of symmetry (4), for clamping a segment of said elongated body (A), the guiding boxes (3) being mounted mobile on said frame (2) through operating means (5) arranged so as to ensure translational control of the extension of the operating cylinder and the spring means, on the one hand, parallel to each other, and on the other hand, according to a direction oriented perpendicular to said axis of symmetry (4),
   wherein said operating means (5) associated with each of said boxes (3) comprise:
   (i) at least one linear actuator (5) including an operating cylinder (6) extended by spring means (7), the operating cylinder (6) and the spring means (7) each having a longitudinal extension axis (6', 7'), said extension axes (6', 7') being oriented at least approximately coaxially relative to each other, so as to form together an extension axis (5') of said linear actuator (5), and
   (ii) programmable means for controlling said operating cylinder (6) in extension, wherein each operating cylinder consist in electric cylinders each including electric motor means for the rotational operation of a screw associated with a rod part through a nut.

2. The tensioner according to claim 1, characterized in that the one or more spring means (7) consist in a cylinder-shaped spring.

3. The tensioner according to claim 1, characterized in that each linear actuator is equipped with force sensor means, to measure at least the value of the compression force exerted on said linear actuator (5), in that each operating cylinder and the spring means (7) each include extension sensor means (10, 11) to measure the value of their respective extension, and in that the programmable means control the extension of each operating cylinder (6) as a function, on the one hand, of said measured compression force value and of a compression force set-value, and on the other hand, of the extension value of the linear actuator (5) measured by said extension sensors (10, 11).

4. The tensioner according to claim 3, characterized in that the tensioner includes at least two guiding boxes (3) arranged opposite to each other, distributed about the axis of symmetry (4) of the frame, and in that the programmable means associated with the opposite guiding boxes (3) control the extension of the operating cylinders (6) of the opposite guiding boxes as a function also of the extension value of the opposite linear actuators (5).

5. The tensioner according to claim 4, characterized in that the programmable means control the extension of the opposite operating cylinders (6) so that the extension values of the opposite linear actuator (5) are at least approximately identical.

6. The tensioner according to claim 3, characterized in that the extension sensor means (11) equipping the spring means (7) consist in a linear encoder.

7. The tensioner according to claim 3, wherein the extension sensor means (10) equipping said operating cylinder (6) consist in a rotational encoder associated with the screw (6b) of the operating cylinder.

8. The tensioner according to claim 1, characterized in that the operating cylinders (6) each have a stroke length that is higher than a stroke length of the spring means (7).

9. The tensioner according to claim 1, characterized in that the linear actuators (5) are each fixed on the frame (2) and on one of the guiding boxes (3), the actuators (5) being oriented so that the operating cylinder (6) of the linear actuators is fastened to said frame (2) and so that the elastic spring means (7) of the operating cylinder are fastened to one of said guiding boxes (3).

10. The tensioner according to claim 4, characterized in that the programmable means control the extension of the opposite operating cylinders (6) so that the extension values of the opposite linear actuator (5) are identical.

\* \* \* \* \*